United States Patent [19]

Caley

[11] Patent Number: 4,680,938
[45] Date of Patent: Jul. 21, 1987

[54] AIR DRYING SYSTEM FOR PNEUMATIC CIRCUITS

[75] Inventor: Douglas A. Caley, King County, Wash.

[73] Assignee: Paccar Inc, Bellevue, Wash.

[21] Appl. No.: 732,227

[22] Filed: May 8, 1985

[51] Int. Cl.$^4$ .................................... F25D 17/06
[52] U.S. Cl. ............................................. 62/93
[58] Field of Search ....................... 62/93; 123/556

[56] References Cited

U.S. PATENT DOCUMENTS

| | | | |
|---|---|---|---|
| 1,668,517 | 5/1928 | Schjolin | 303/11 |
| 2,220,308 | 11/1940 | Whitman | 290/51 |
| 2,512,043 | 6/1950 | Stevens | 303/85 |
| 2,834,638 | 5/1958 | George | 303/85 |
| 2,835,340 | 5/1958 | McGuff et al. | 62/93 X |
| 2,930,658 | 3/1960 | George | 303/8 |
| 3,033,322 | 5/1962 | Hughes | 188/274 |
| 3,226,948 | 1/1966 | Alderson et al. | 62/93 X |
| 3,441,011 | 4/1969 | Karl | 123/542 |
| 3,874,188 | 4/1975 | Zara et al. | 62/93 X |
| 4,235,081 | 11/1980 | Dowling | 62/93 |
| 4,237,696 | 12/1980 | Coblentz | 62/93 |

Primary Examiner—Michael Koczo
Assistant Examiner—Richard R. Cole
Attorney, Agent, or Firm—Seed and Berry

[57] ABSTRACT

An air drying system for pneumatic circuits to provide compressed air at working pressure having a dew point which is below the temperature of the circuits. In one embodiment, the system has an air intake for accepting ambient air having an initial water vapor content, a compressor for over-compressing or highly compressing the air to a pressure which is greater than that necessary for operation of the pneumatic circuit, a heat exchanger which cools the highly compressed air below the dew point thereof to cause some of the water vapor to precipitate, and a regulator to expand the air, resulting in substantially unsaturated compressed air at a relatively moderate working pressure. In the preferred embodiment, the system is on a motor vehicle and the compressed air is cooled by the large volume of combustion air to the engine.

10 Claims, 1 Drawing Figure

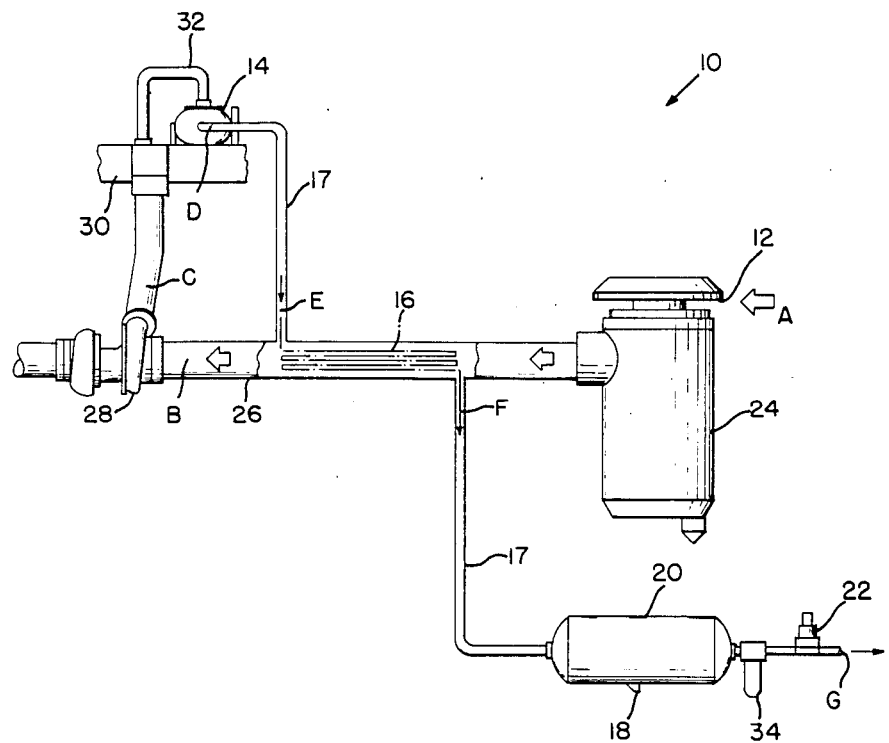

AIR DRYING SYSTEM FOR PNEUMATIC CIRCUITS

DESCRIPTION

1. Technical Field

The invention relates to an apparatus and method for suppressing the dew point of compressed air containing water vapor so that the dew point of the compressed air is substantially below the temperature to which the compressed air is applied. More specifically, the invention relates to a method and an apparatus for overcompressing air having a water vapor content beyond the pressure necessary for operation of a pnuematic circuit, cooling the highly compressed air below the dew point thereof to precipitate out some of the water vapor, and expanding the highly compressed air to a working pressure so that the working pressure air has a dew point substantially below the temperature of the circuit elements.

2. Background Art

A continuing problem in the field of pneumatic circuits or systems is the presence of moisture and contamination in the system or circuit. The problem is particularly acute in compressed air supply systems for automotive or other applications where the water content of the intake air is variable and where the pneumatic circuit elements, such as brake pistons and brake lines, are exposed to ambient conditions. For example, when inlet air, having a relative humidity of 60% at an ambient temperature of 70° F., is compressed to a working pressure of 100 psig (pounds per square inch, gauge pressure), the temperature of the compressed gas increases according to the ideal gas law. The dew point of the compressed air also correspondingly increases with the increased pressure of the air. The dew point is the maximum temperature at which water vapor will precipitate out of air having a given specific humidity. In this example, the ambient air at 70° F., atmospheric pressure and 60% humidity has a dew point of 55° F. Therefore, water vapor will not precipitate out of the ambient air unless the ambient temperature drops to 55° F. When this air is compressed to a pressure of 100 psig, the temperature of the air will rise to 420° F. and the dew point thereof will rise to 335° F. Thus, if at any point in the pneumatic circuit, the temperature of a circuit element, such as a brake piston or brake line, is below 335° F., precipitation will occur, introducing liquid water into the circuit.

In the case of vehicular compressed air systems, other contaminants which have been introduced into the system or circuit can combine with the liquid water to cause failure of the system. These systems are typically pressurized by compressors which are lubricated by oil. This lubricating oil often enters the compression chamber of the compressor and thus the entire compressed air system. The oil contains combustion contaminants, additives, and dirt particles. If water is also present in the system, these contaminants and the oil can mix with the water to form a highly viscous mixture which is deleterious to the system. Furthermore, the presence of water in the system leads to corrosion of the circuit elements. Once corrosion or rust is introduced into the system, these particles flake off the walls of the components and become embedded in rubber valve seats, causing failures of the system.

One conventional solution to prevent condensation of water vapor from compressed air at the application points or circuit elements of the system is to cool the compressed air to the temperature of the circuit elements to pre-precipitate the water vapor from the compressed air. This is typically achieved in the automotive field with the use of aftercoolers. An aftercooler is a conventional heat exchanger which is connected to some portion of the pressurized air system. Ideally, the aftercooler reduces the temperature of compressed air to ambient temperature. Water vapor within the compressed air (using the example where compressed air has a temperature of 420° F. and a dew point of 350° F.) will precipitate out, leaving ambient temperature, compressed air having a dew point at the ambient temperature for application to the pneumatic circuit. Thus, as long as the temperature of the circuit elements is not below the temperature of the compressed air leaving the aftercooler (i.e., ambient temperature), no further precipitation will result. However, a serious disadvantage of this aftercooler system is that heat exchangers typically cannot bring the temperature of a compressed gas all the way down to ambient temperature since these heat exchangers are not 100% efficient. Thus, the temperature of the circuit element is always slightly below the temperature of the compressed air leaving the aftercooler and some further precipitation occurs. A second disadvantage of the aftercooler system is that a particular circuit element may be below ambient temperature for some reason. In this case, even if the heat exchanger were 100% efficient, further precipitation would occur. Thus, a fundamental disadvantage of the aftercooler system is its inability to reduce the dew point of a compressed gas below ambient temperature. This is because the compressed air leaving the aftercooler is always a saturated gas, even though some water has precipitated out.

A further disadvantage of the aftercooler system is that it typically relies on an airflow around the heat exchanger produced by the motion of the vehicle. Thus, if a truck or other vehicle is stationary, the efficiency of the heat exchanger is very low, resulting in a very small reduction in the dew point of the compressed air. This disadvantage is compounded due to the fact that, at start-up, the vehicle is usually stationary but must charge its compressed air system, creating a high compressed air demand.

A second conventional solution involves removing water vapor directly from a gas, thereby bypassing the problem of producing saturated pressurized air at a given temperature, without precipitating the vapor. Desiccant air dryers have been developed for this purpose. These dryers contain a material in beaded form to remove water vapor molecules directly from the air. Thus, with desiccant systems, it is conceivable that the ultimate dew point of a compressed air mass can be reduced or suppressed to any temperature. However, desiccant air dryers are rendered inoperative by the presence of oil in the desiccant. In vehicular applications, it is virtually impossible to completely eliminate oil from the air system. Thus, desicanttype air dryers must be replaced regularly when used in the systems.

Coalescing filters can be added to the first aftercooler-type air drying system to remove entrained water droplets from the airflow. However, here again, only precipitated water vapor is being removed. Thus, the dew point of the air mass is not further reduced by coalescing filters and any further reduction in the temperature of the air mass will result in further precipitation.

DISCLOSURE OF INVENTION

It is an object of the invention to provide compressed air at working pressure to pneumatic systems or circuits wherein the dew point of the compressed air is significantly below the temperature of the circuit elements to prevent precipitation of water vapor within the compressed air at the circuit elements.

It is a further object of the invention to remove water vapor from compressed air in proportion to the amount of compressed air produced by the invention.

It is yet another object of the invention to provide compressed air having the dew point thereof below the temperature of circuit elements in a vehicle when the vehicle is stationary.

The invention achieves these objects by providing an air drying system which compresses air having an initial water vapor content to a pressure which is significantly greater than the working pressure necessary for operation of a pneumatic circuit. The system then cools the highly compressed air below the dew point thereof so that some of the water vapor therein condenses to the liquid state, resulting in relatively cool, highly compressed, saturated air. The system then removes the condensed water from the pneumatic circuit so that the liquid water cannot reenter the vapor state at any point in the system. The relatively cool, highly compressed, saturated air is then expanded to a working pressure for application to the pneumatic circuit. After the saturated air has expanded, the water vapor remains in the vapor state, corresponding to a reduction in the dew point of the working pressure air below the temperature to which the highly compressed air was cooled. Stated differently, the invention avoids the problem of supplying saturated air to the pneumatic circuit by first overcompressing the air, precipitating out some of the water vapor by cooling the overcompressed air, and then further expanding the air to a working pressure so that the dew point of the expanded air is suppressed substantially below the temperature to which the highly compressed air was cooled. Thus, the invention gives a few degrees of dew point temperature "cushion" below the temperature normally expected to be encountered by the pneumatic components of, for example, a vehicle.

The highly compressed air can be cooled to ambient temperature prior to its expansion to working pressure. Thus, the expanded working pressure air which is supplied to the pneumatic circuit has a dew point which is substantially below the ambient temperatures to which the circuit elements are exposed. In illustration of the preferred embodiment, ambient air having an initial temperature of 70° F. and an initial water vapor content corresponding to 60% relative humidity is compressed to a pressure of approximately 150 psig. The temperature of this air is therefore increased to a higher temperature (for this example, 420° F.), and the dew point of this compressed air is 360° F. The highly compressed air is then cooled to the ambient temperature of 70° F. Since 70° F. is well below 360° F. (the dew point of the air), water vapor will precipitate. The precipitate is then removed from the system. At this point, highly compressed air at 150 psig has a temperature of 70° F. and a dew point of 70° F. That is, the air is saturated since precipitation has occurred and there has been no other change in pressure, temperature or volume. The air system now expands this relatively cool, highly compressed, saturated air to a working pressure of approximately 100 psig. This causes a reduction of the dew point below the ambient temperature in this example to 59° F. Application of this expanded air to the circuit elements will not result in precipitation since the circuit elements are approximately at ambient (70° F.) temperature.

The cooling of the highly compressed air can be achieved by a heat exchanger which is exposed to ambient air. In the preferred embodiment, the heat exchanger is placed in the flow of intake air which is to be compressed. Thus, the rate of cooling of the compressed air is directly proportional to the production of compressed air. This air drying system can always provide compressed air at working pressure wherein the compressed air has a dew point below the temperature of the circuit elements.

The preferred embodiment is well adapted for application to vehicle compressed air systems wherein the exchanger is placed in the air intake or inlet for the engine. The relatively cool, highly compressed, saturated air can be stored in the supply tank of a typical vehicle air system at up to 150 psig and can be expanded by a conventional regulator to a working pressure of 100 psig. Coalescing filters can be added to remove water droplets entrained in the flow of relatively cool, highly compressed, saturated air prior to expansion to working pressure.

BRIEF DESCRIPTION OF THE DRAWING

FIG. 1 shows an air drying system, in accordance with the present invention, in use with various components of a vehicle air system.

BEST MODE FOR CARRYING OUT THE INVENTION

In FIG. 1, an air drying system, in accordance with the present invention, is generally indicated at reference numeral 10. The system has an air intake 12 for accepting air having an initial water vapor content. A compressor 14 is provided to accept air from the air intake and for compressing the air to a relatively high pressure. This relatively highly compressed and therefore high-temperature air is applied to a heat exchanger 16 through a high-pressure conduit 17. The heat exchanger reduces the temperature of the relatively high-pressure air below the dew point thereof so that some of the water vapor in the high-pressure air will condense into the liquid state. This condensed water is then removed by a standard ejector or drain 18. A supply tank 20 can be provided to store a relatively large volume of relatively cool, highly compressed and saturated air from the heat exchanger. The air in the supply tank is necessarily saturated since water vapor has precipitated from this air and there has been no further change in the pressure, temperature or volume of the air after the heat exchanger. Thus, the air in the supply tank has a dew point which is equal to the temperature of the air. At this point, direct application of the relatively cool, highly compressed, saturated air to a pneumatic circuit could result in precipitation of water vapor from the air if the temperature of a circuit element is below the dew point (i.e., temperature) of the compressed air. Thus, a regulator 22 is provided to expand the air in the supply tank to a lower working pressure, resulting in a further reduction of the dew point below the temperature of the air in the supply tank.

In the embodiment shown in FIG. 1, the air drying system 10 is applied to a vehicle air supply system. The air intake 12 defines an air intake conduit including an engine air cleaner 24, a low-pressure conduit 26, a turbocharger 28, and an engine intake manifold 30. The compressor 14 is fed elevated pressure, ambient air from the engine intake manifold through a compressor inlet tube 32. The compressor output is dependent upon engine RPM. Similarly, the air flow through the low-pressure conduit and thus past the heat exchanger 16 is also dependent upon engine RPM. The Heat exchanger 16 is placed within the low-pressure conduit 26 between the air cleaner and the turbocharger so that the flow of ambient air around the heat exchanger is proportional to the flow of highly compressed air through the heat exchanger. Thus, the heat exchanger will transfer excess heat energy from the highly compressed air in the heat exchanger to the ambient air proportionately, regardless of whether or not the vehicle is moving.

It is preferred to over-compress the ambient air to a pressure of approximately 150 psig (pounds per square inch, gauge pressure) and then apply this highly compressed air to the heat exchanger, to precipitate some water vapor into the liquid state, to eject the condensed liquid through the standard ejector 18, and then to expand the highly compressed air to a working pressure of approximately 100 psig through the regulator 22, providing the circuit elements of a pneumatic system with working pressure air having a dew point which is substantially below ambient temperature. To illustrate, the following example is provided. Ambient air having a temperature of 70° F. and a relative humidity of 60% is accepted through the air intake 12 at location A. On passing around the heat exchanger 16, the air will experience a 4° rise in temperature to 74° F. at location B. The turbocharger will increase the pressure and temperature of the air to approximately 20 psig and 325° F. at location C. The compressor 14 draws this air from the intake manifold 30 through the compressor inlet tube 32 and compresses the air to a pressure of 150 psig throughout the high-pressure conduit 17 and supply tank 20. Corresponding to the increase in pressure, this relatively highly over-compressed air experiences an increase in temperature, according to the ideal gas law, to 420° F. at location D at the output of the compressor. Some cooling occurs in high-pressure conduit 17 so that the temperature of the relatively highly compressed air is reduced to 350° F. at location E prior to its passage through the heat exchanger 16. In addition to the increased temperature of the air caused by the over-compression thereof, the dew point of the air is also substantially increased to 360° F. Thus, application of the highly compressed air to the heat exchanger 16 will result in a reduction of the temperature of the highly compressed air to approximately ambient temperature (70° F.) at location F, causing some of the water vapor to precipitate. This liquid water is then removed from the system at the drain 18. The resulting relatively cool, highly compressed, and necessarily saturated air is stored in the supply tank 20. As the temperature of the highly compressed air is reduced by the heat exchanger below the 360° F. dew point thereof, water vapor will continue to precipitate. Thus, once the heat exchanger has brought the air to a temperature of 70° F., precipitation will stop. However, any further reduction in temperature at this point would cause further precipitation. A further reduction in the dew point (below ambient temperature) is desired and is achieved by expanding the air through the regulator 22 to a working pressure of approximately 100 psig at location G. The ideal gas law shows that the resulting dew point of this expanded air is approximately 59° F., which is well below the ambient temperature (70° F.) of the pneumatic circuit. Thus, further precipitation in the circuit is avoided. Furthermore, since the expanded air has a relatively low humidity, evaporation of any liquid water in the air system will be encouraged. The absence of liquid water from the air system also reduces the formation of highly corrosive mixtures within the air system which cause corrosion and lead to system failures.

Typical engine installations operating at partial load and 1600 rpm will provide a flow of ambient air through the air intake 12 and to the engine intake manifold 30 of a approximately 500 cfm (cubic feet per minute), whereas the output of the compressor at that engine rpm is only 14 cfm. Thus, the efficiency of the heat exchanger 16 is very good. It is preferred that the ratio of the rate of flow of intake air around the heat exchanger 16 to the rate of flow of highly compressed air out of the compressor 14 is approximately 36:1. Furthermore, since the compressor is driven directly off the engine, the output of the compressor and the intake of air around the heat exchanger will always be proportional so that the efficiency of the heat exchanger is maintained regardless of whether or not the vehicle itself is moving.

A coalescing filter 34 can be added to the system anywhere between the regulator 22 and the heat exchanger 16 to remove entrained precipitated air droplets from the air-flow.

It will be appreciated that other variations and embodiments of this invention employing the process of overcompressing an air mass having an initial water vapor content to a pressure above that necessary for operation of a pneumatic circuit and then cooling the air mass below the dew point thereof, and then expanding the air mass to a working pressure to further suppress the dew point, are contemplated. Thus, the invention is not to be limited by the scope of the above description, but is to be limited by the scope of the claims which follow.

I claim:

1. An air drying system for vehicle pneumatic circuits operating at a working pressure substantially above normal atmospheric pressure and a normally ambient operating temperature to prevent condensation of water vapor within the circuit, comprising:
   (a) an air intake for introducing air having an initial water vapor content into the system;
   (b) means for compressing air from the ambient air intake to a relatively high pressure, substantially greater than the working pressure of the pneumatic circuit and to a correspondingly high temperature due to the compression thereof, wherein the relatively high pressure is greater than the working pressure of a pneumatic circuit by an amount sufficient to allow subsequent cooling and expansion of the relatively high compressed and high temperature air to lower the dew point thereof substantially below the normal operating temperature of a pneumatic circuit;
   (c) a heat exchanger having an input connected to the output of the compressing means and an exterior exposed to a substantially ambient temperature air flow for cooling the relatively highly compressed and high-temperature air from the compressing means to a temperature below the dew point thereof to condense out some of the water vapor therein, resulting in relatively cool, highly compressed, saturated air and condensed water so that subsequent expansion of the relatively cool, highly compressed, saturated air can lower the dew point thereof substantially below the normal operating temperature of the pneumatic circuit at the output of the heat exchanger;

(d) means, connected to the output of the heat exchanger, for removing the condensed water from the relatively cool, highly compressed, saturated air; and (e) means connected to the water removing means for expanding the relatively cool, highly compressed, saturated air to the working pressure of the pneumatic circuit to suppress the dew point of the expanded air substantially below the normally ambient operating temperature of the pneumatic circuit.

2. The air drying system of claim 1 wherein the air drying system is in a vehicle having an engine and an engine air inlet, and wherein the air intake includes the engine air inlet, and the heat exchanger is positioned in the engine air inlet.

3. The air drying system of claim 2 wherein the air intake defines an air intake conduit serially including an engine air cleaner and an engine intake manifold, and wherein the heat exchanger is placed in the air intake conduit.

4. The air drying system of claim 3, including a supply tank adapted to store a relatively large volume of relatively cool, highly compressed, saturated air from the heat exchanger.

5. The air drying system of claim 3 wherein the relatively high pressure approximately 150 psig (pound per square inch, gauge pressure) and wherein the working pressure is approximately 100 psig.

6. The air drying system of claim 5, including a coalescing filter to trap entrained condensed water droplets in the flow of the relatively cool, highly compressed, saturated air from the heat exchanger.

7. The air drying system of claim 1 including means for causing the heat exchanger exterior airflow to be proportional to and greater than the flow of highly compressed, high temperature air through the heat exchanger input.

8. An air drying system for use in a vehicle having an internal combustion engine and air serviced devices including air brakes, which are part of a pneumatic circuit operting at a working pressure substantially above normal atmospheric pressure and having portions exposed to ambient conditions wherein the engine draws engine intake air approximately at ambient temperature comprising:

means for compressing a small portion of the drawn engine intake air to a high pressure, substantially greater than the working pressure of the pneumatic circuit;

means for transferring sufficient heat energy from the highly compressed air to the engine intake air to cool the highly comressed air below the dew point thereof and approximately to ambient temperature to condense water out of the highly compressed air;

means connected to the heat energy transferring means for removing the condensed water from the system; and means for expanding the cooled, highly compressed air to the working pressursе of the pneumatic circuit to suppress the dew point thereof substantially below ambient temperature.

9. The air drying system of claim 8, including means for driving the compressing means proportionally to the engine speed so that the efficiency of the air drying system is substantially independent of vehicle speed.

10. An air drying system for use in a vehicle having an internal combustion engine and air serviced devices which are part of a pneumatic circuit operting at a working pressure substantially above normal atmospheric pressure and having portions exposed to ambient conditions wherein the engine draws engine intake air approximately at ambient temperature, comprising:

means, driven proportionally to the engine speed, for compressing a relatively small proportion of the drawn engine intake air to a high pressure, substantially greater than the working pressure of the pneumatic circuit;

means for transferring sufficient heat energy from the highly compressed air to the entire, drawn engine intake airflow to cool the highly compressed air approximately to ambient temperture and condense water vapor therefrom;

means connected to the output of the heat transfer means for removing condensed water from the system; and means for expanding the cooled, highly compressed air to the working pressure of the pneumatic circuit to suppress the dew point thereof substantially below ambient temperature.

* * * * *